United States Patent
Ito

(10) Patent No.: US 11,004,631 B2
(45) Date of Patent: May 11, 2021

(54) ROTATION OPERATION INPUT DEVICE AND ELECTRONIC APPARATUS THAT ACHIEVE BOTH DOWNSIZING AND GOOD OPERATION FEELING

(71) Applicant: CANON KABUSHIKI KAISHA, Tokyo (JP)

(72) Inventor: Junji Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/732,468

(22) Filed: Jan. 2, 2020

(65) Prior Publication Data

US 2020/0219684 A1 Jul. 9, 2020

(30) Foreign Application Priority Data

Jan. 9, 2019 (JP) .............................. JP2019-002021

(51) Int. Cl.
| | |
|---|---|
| *G09G 5/00* | (2006.01) |
| *H01H 25/06* | (2006.01) |
| *H01H 3/02* | (2006.01) |
| *H01H 19/10* | (2006.01) |
| *H01H 25/04* | (2006.01) |
| *H04N 5/225* | (2006.01) |

(52) U.S. Cl.
CPC ............ *H01H 25/065* (2013.01); *H01H 3/02* (2013.01); *H01H 19/10* (2013.01); *H01H 25/041* (2013.01); *H04N 5/2253* (2013.01); *H01H 2025/045* (2013.01)

(58) Field of Classification Search
CPC .......... G06F 3/01; G06F 3/0304; G06F 3/033; G06F 3/042; G06F 3/038; H01H 25/065; H01H 3/02; H01H 19/10; H01H 25/041; H01H 2025/045; H01H 2025/041; H04N 5/2253; H04N 5/2254
USPC ................................................. 345/156, 184
See application file for complete search history.

(56) References Cited

U.S. PATENT DOCUMENTS

| | | |
|---|---|---|
| 10,091,400 B2 | 10/2018 | Yamamoto et al. |
| 10,200,576 B2 | 2/2019 | Yamamoto et al. |

(Continued)

FOREIGN PATENT DOCUMENTS

JP 2017-091611 A 5/2017

*Primary Examiner* — Jennifer T Nguyen
(74) *Attorney, Agent, or Firm* — Venable LLP

(57) ABSTRACT

A rotation operation input device that achieve downsizing and excellent durability while offering clear and good operation feeling. The rotation operation input device comprises detected portions which is provided concentrically with a rotation operation member about a rotation axis and rotates along with rotation of the rotation operation member, and a detection unit which detects the detected portions and a phase of the rotation operation member. The detected portions are provided at a predetermined interval along an outer edge of the rotation operation member, this outer edge is provided with a recess/protrusion part, the recess/protrusion part has recess parts each positioned between the detected portions and protrusion parts each positioned on each straight line connecting each detected portion and the rotation axis, and an urging member that urges the recess/protrusion part is provided on a side opposite to the detected portions across the recess/protrusion part.

12 Claims, 5 Drawing Sheets

(56) References Cited

U.S. PATENT DOCUMENTS

| | | | | |
|---|---|---|---|---|
| 2008/0257704 A1* | 10/2008 | Tsuduki | ............... | H01H 25/041 |
| | | | | 200/5 A |
| 2011/0083952 A1* | 4/2011 | Hu | ....................... | H01H 25/041 |
| | | | | 200/6 R |
| 2017/0126942 A1* | 5/2017 | Yamamoto | ........... | H04N 5/2253 |
| 2018/0302537 A1 | 10/2018 | Yamamoto et al. | | |

* cited by examiner

ROTATION OPERATION INPUT DEVICE AND ELECTRONIC APPARATUS THAT ACHIEVE BOTH DOWNSIZING AND GOOD OPERATION FEELING

BACKGROUND OF THE INVENTION

Field of the Invention

The present invention relates to a rotation operation input device and an electronic apparatus that achieve both downsizing and a good operation feeling, and more particularly relates to a rotation operation input device used in an electronic device such as an image pickup apparatus.

Description of the Related Art

Image pickup apparatuses, such as a digital camera that is one of electronic apparatuses, generally have a rotation operation input device (rotation operation dial device) on a substantially planer portion on the rear side (thus, a photographer side) of their casings. The photographer can continuously perform an input operation on the rotation operation input device.

Recently, image pickup apparatuses have been facing demands for downsizing of a main body of the image pickup apparatus, and for increasing the size of a screen of a display device, such as a liquid crystal display (LCD), provided on the rear side of the image pickup apparatus for the sake of higher visibility.

For this reason, the rotation operation dial provided to the rotation operation dial device has been demanded to be appropriately laid out, and particularly have been demanded to have a smaller outer diameter. The rotation operation dial device has been demanded to have higher reliability over many years of use.

As a device to meet the above-described demands, for example, a rotation operation dial device using a photointerrupter as a detection unit that detects the rotation of the rotation operation dial has been known (Japanese Laid-Open Patent Publication (kokai) No. 2017-91611). In Japanese Laid-Open Patent Publication (kokai) No. 2017-91611, the photointerrupter is arranged on the outer circumference side of the rotation operation dial, and a spring member and a click groove for generating the rotation operation force (click force) are arranged on a rotation center axis side. Thus, in Japanese Laid-Open Patent Publication (kokai) No. 2017-91611, the rotation operation dial device is downsized by the photointerrupter, the spring member and the like being arranged in a positional relationship not interfering with one another in the thickness direction.

However, in Japanese Laid-Open Patent Publication (kokai) No. 2017-91611 described above, a click mechanism, giving click force to the rotation operation dial, has the spring member arranged at a position to face an outer circumference surface of a shaft portion on the back surface of the rotation operation dial. The click force is generated with an uneven surface, on which the spring member moves in amplitude in accordance with the rotation of the rotation operation dial, formed on an outer circumference surface of a bearing portion provided in the rotation operating dial.

For this reason, in a case of an increase in the number of clicks, that is, the number of recesses and protrusions of the uneven surface while keeping the outer diameter size of the rotation operation dial the same, the recesses and protrusions on the uneven surface, are arranged close to each other in the circumference direction. This results in a small unevenness (level difference) on the recesses and protrusions on which the spring member moves in amplitude. As a result, it is difficult for the photographer to get clear and good operation feeling (clicking feel).

Furthermore, in Japanese Laid-Open Patent Publication (kokai) No. 2017-91611, the spring member for generating an operation force is laid out between the photointerrupter provided on the outer circumference side of the rotation operation dial and the uneven surface provided on the outer circumference surface of the shaft portion. In such layout, as much as the outer diameter of the rotation operation dial is reduced, the photointerrupter also needs to be shifted toward the axis center side accordingly. Thus, an area where the spring member can move in amplitude is reduced, making it difficult to increase the rotational operation force.

This results in degraded operation quality such as weak operation force, and also results in an erroneous operation being likely to occur when the photographer accidentally touches the rotation operation dial, for example. Thus, a certain level of rotation operation force needs to be set for securing high operation quality and preventing erroneous operation. However, with the technique disclosed in Japanese Laid-Open Patent Publication (kokai) No. 2017-91611, it is difficult to achieve both downsizing and high quality operation force in a rotation operation dial device.

SUMMARY OF THE INVENTION

The present invention provides a rotation operation input device and an electronic apparatus that achieve downsizing as well as excellent durability while offering clear and good operation feeling.

Accordingly, the present invention provides a rotation operation input device configured to perform setting in accordance with an operation on a rotation operation member, the rotation operation input device comprising detected portions provided concentrically with the rotation operation member about a rotation axis of the rotation operation member and configured to rotate along with rotation of the rotation operation member, and a detection unit configured to detect the detected portions and detect a phase of the rotation operation member, wherein the detected portions are provided at a predetermined interval along an outer edge of the rotation operation member, the outer edge of the rotation operation member is provided with a recess/protrusion part for continuously providing a clicking feel, recess parts of the recess/protrusion part are each positioned between the detected portions, protrusion parts of the recess/protrusion part are each positioned on each straight line connecting each detected portion and the rotation axis, and an urging member that urges the recess/protrusion part is provided on a side opposite to the detected portions across the recess/protrusion part.

The present invention can achieve downsizing as well as excellent durability while offering clear and good operation feeling.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. An example of a rotation operation input device according to an embodiment of the present invention will be described below.

Figure 1:
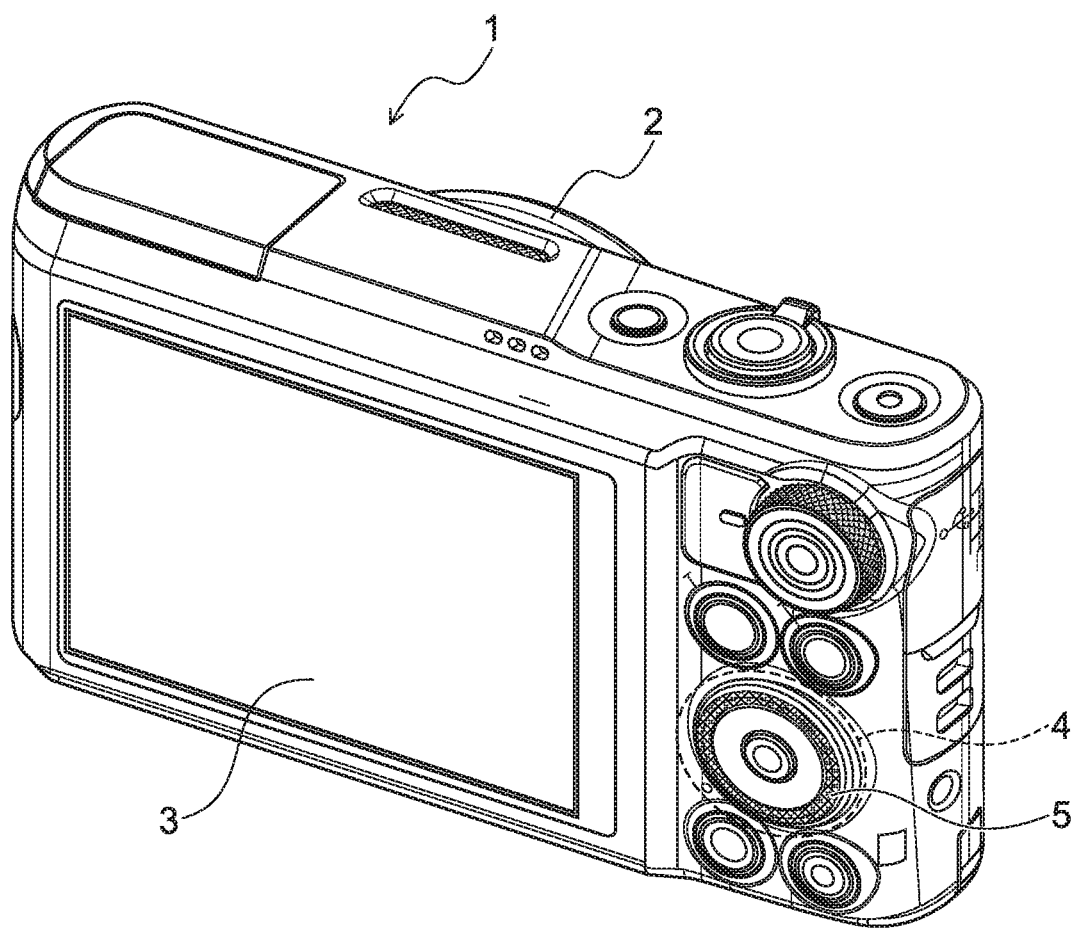
FIG. 1 is a perspective view showing an electronic apparatus including a rotation operation input device according to an embodiment of the present invention as viewed from a rear side.

FIG. 1 is a perspective view showing an electronic apparatus including a rotation operation input device according to an embodiment of the present invention as viewed from a rear side. It should be noted that the electronic apparatus shown is an image pickup apparatus such as a digital camera (hereinafter simply referred to as a camera) for example. It should be noted that although the image pickup apparatus is described as an example of the electronic apparatus, the electronic apparatus is not limited to the image pickup apparatus.

A camera 1 is provided with a lens barrel 2 on a front surface side (on a front surface) (subject side), and an optical image is formed on an image pickup element (not shown) through the lens barrel 2. The image pickup element outputs an image corresponding to the optical image. A control unit (not shown) displays the image on a display device 3 such as a liquid crystal display (LCD) disposed on a back surface (on a rear side) of the camera 1.

A rotation operation dial (a rotation operation member) 5, provided to a rotation operation input device (hereinafter referred to as a rotation operation dial device) 4, is arranged on the right side of the display device 3 as viewed from the rear side of the camera 1. For example, the rotation operation dial 5 is assigned a rotation operation corresponding to a shooting setting condition requiring continuous input operations such as manual focus, white balance, or the like. Furthermore, the rotation operation dial 5 is assigned a push button operation such as a toggle operation for setting on/off/auto and the like of flash light emission, as a combined operation of a swing operation and a rotation operation in a plurality of directions.

Figure 2:
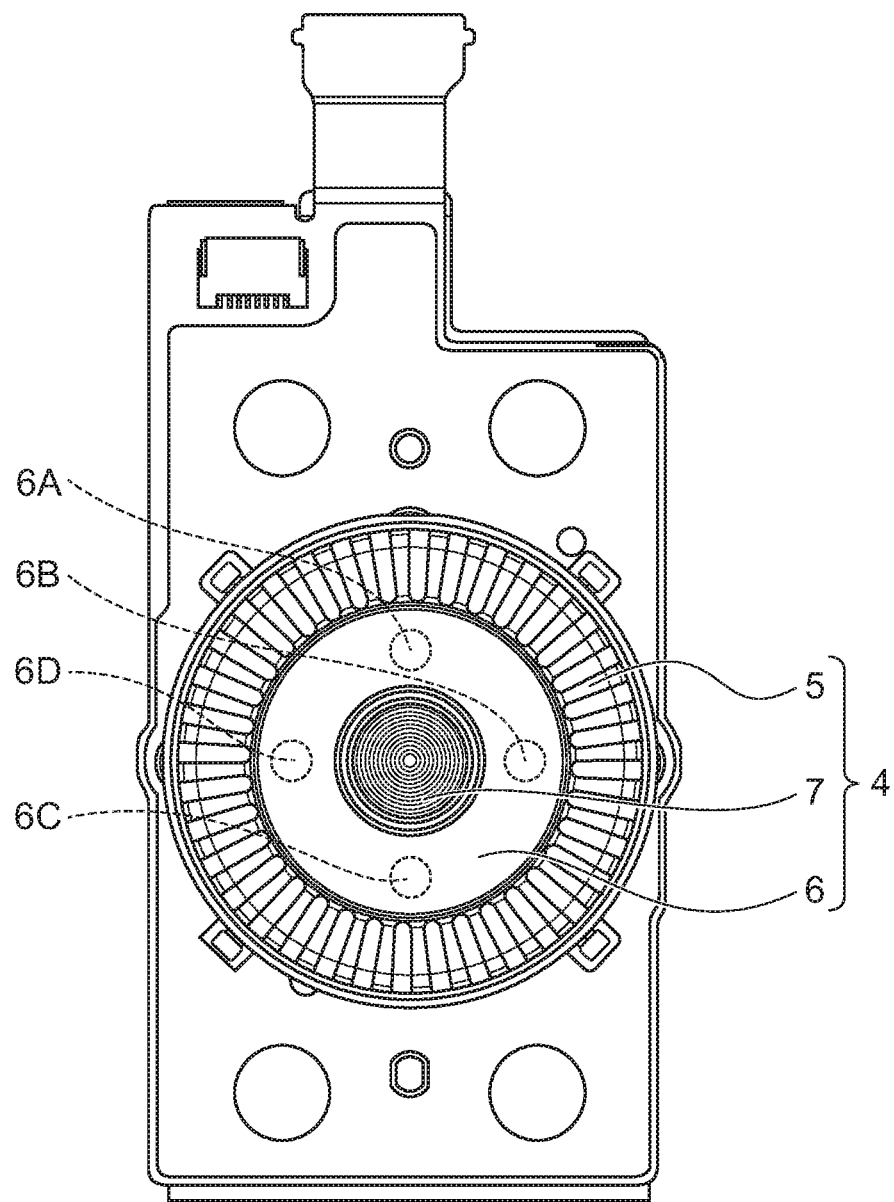
FIG. 2 is a diagram for describing the rotating operation dial device shown in FIG. 1.

FIG. 2 is a diagram for describing the rotation operation dial device 4 shown in FIG. 1.

The rotation operation dial 5 provided to the rotation operation dial device 4 is rotatably supported and has upper, lower, left, and right portions that can operate as buttons upon being pressed. On a display board 6, icons indicating button functions in the up/down/left/right directions are shown at a 90 degree interval as display items 6A, 6B, 6C, and 6D. The display board 6 does not rotate, but is swingably supported so as to be able to follow in response to the swing of the rotation operation dial 5.

A center button 7 is non-rotatably supported at a portion (non-swinging portion) in the display board 6 that does not swing, to be mentioned later. Thus, the rotation operation dial device 4 is made up of three members in an outer view. Out of these three members, only the rotation operation dial 5 rotates. When the rotation operation dial 5 is pressed in the upper, lower, left, or right direction, the display board 6 swings by following the rotation operation dial 5. Further, the center button 7 operates independently, that is, does not follow the rotation or swing of the rotation operation dial 5, and functions as a button that is movable only upon being pressed.

It should be noted that the center button 7 is used to display a setting screen on the display device and to determine various settings.

In the shown example, the rotation operation dial 5 is assigned an operation for switching between functions when the camera 1 is used for shooting. For example, exposure compensation is assigned to the display item 6A, and auto light emission, forced light emission, and light emission prohibition for flash are assigned to the display item 6B. Furthermore, normal, far distance and macro for autofocus are assigned to the display item 6C and self-timer time (10 seconds and 2 seconds) is assigned to the display item 6D. To select any of these display items 6A to 6D, the rotation operation dial 5 is rotated to switch among the display items 6A to 6D, and the selection is confirmed by pressing the center button 7.

In addition, by pressing the center button 7, for example, exposure compensation, photometric distribution, white balance, the number of recording pixels, and a compression rate can be selected. As a method for selecting an individual hierarchical function, selection is made by rotating the rotation operation dial 5 and is confirmed by pressing the center button 7. Furthermore, when an image is reproduced, one image, selected from a plurality of images and confirmed, can be enlarged or reduced by rotating the rotation operation dial 5.

Figure 3A:
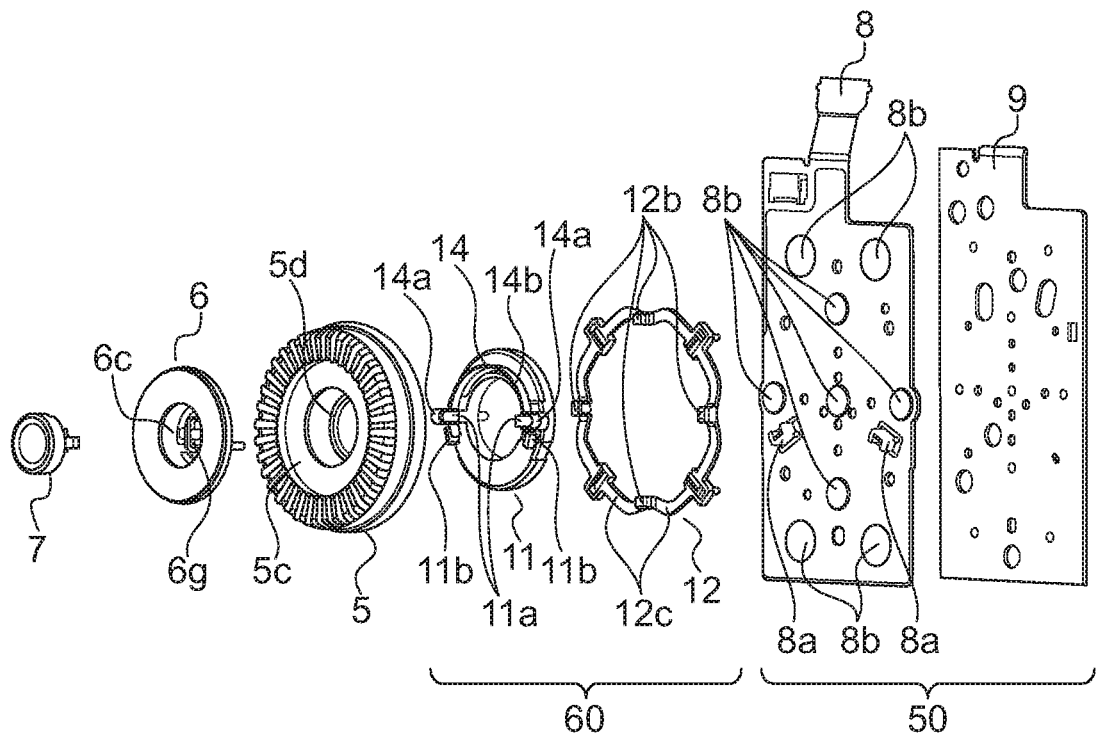
FIGS. 3A and 3B are diagrams for describing assembly of the rotation operation dial shown in FIG. 1.
Figure 3B:
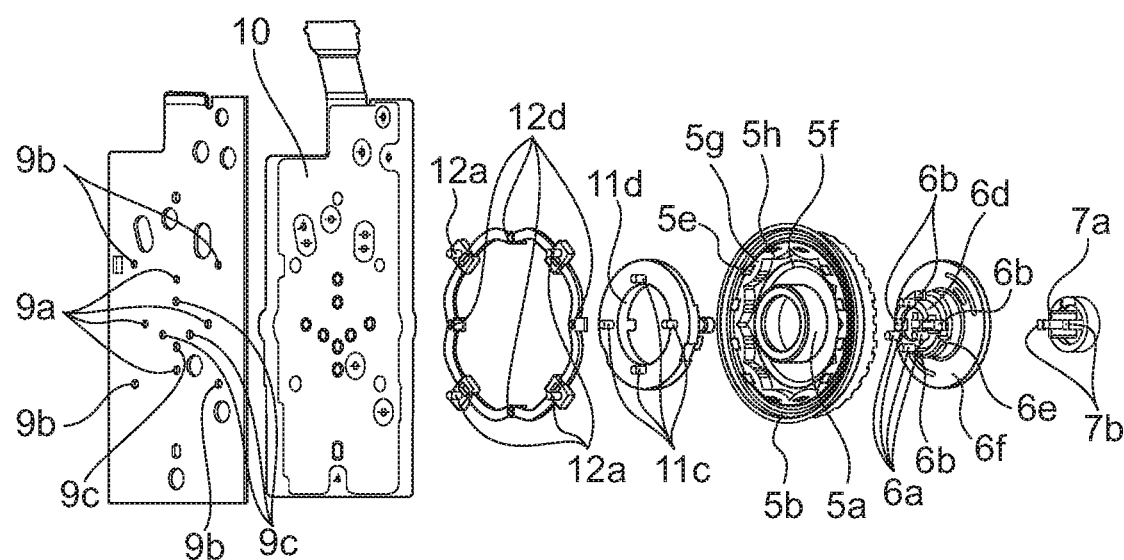

FIGS. 3A and 3B are diagrams for describing assembly of the rotation operation dial 5 shown in FIG. 1. FIG. 3A is an exploded perspective view from rear side of the rotation operation dial 5, in the camera 1 shown in FIG. 1. FIG. 3B is an exploded perspective view from front side of the rotation operation dial 5.

Figure 4A:
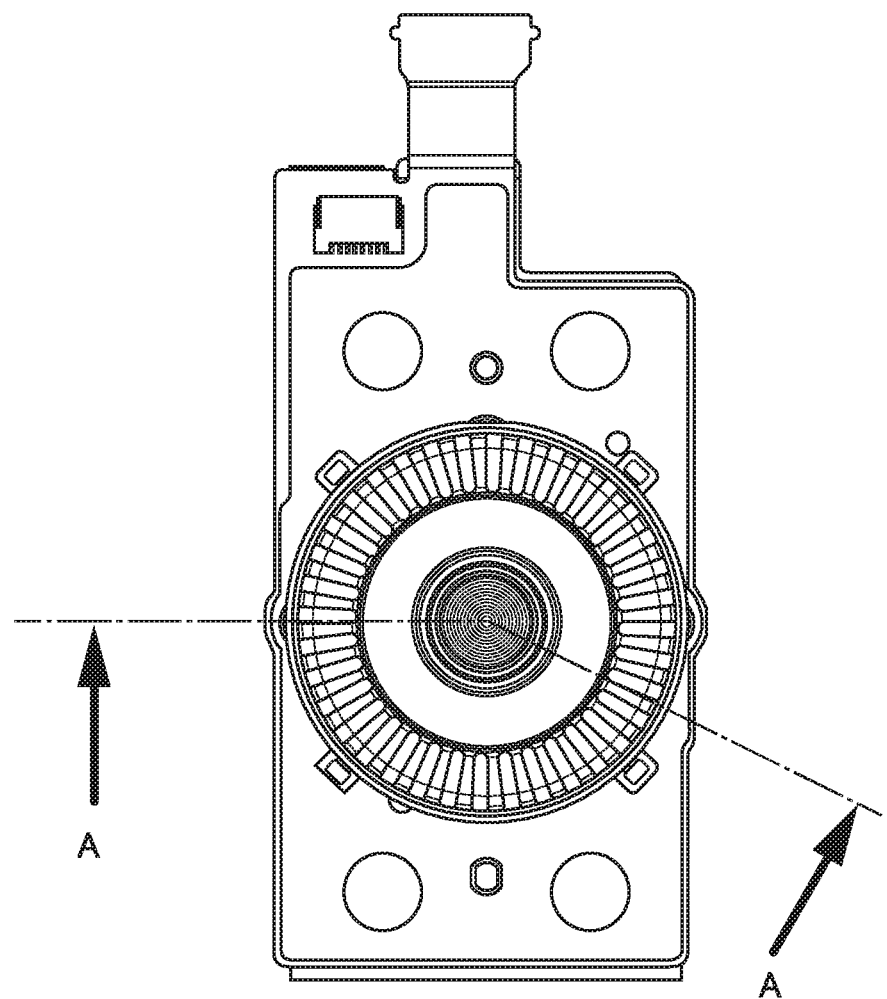
FIGS. 4A and 4B are diagrams for describing an operation of the rotation operation dial shown in FIG. 1.
Figure 4B:
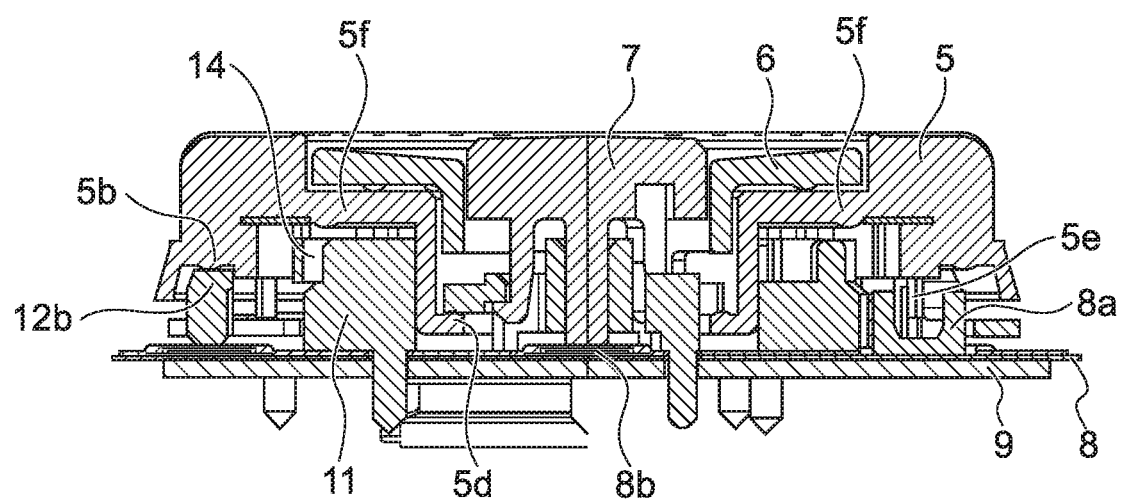

FIGS. 4A and 4B are diagrams for describing an operation of the rotation operation dial 5 shown in FIG. 1. FIG. 4A is a diagram showing the rotation operation dial device 4, and FIG. 4B is a cross-sectional view taken along line A-A in FIG. 4A.

With reference to FIGS. 3A, 3B, 4A, and 4B, a pair of photointerrupters (detection units) 8a are mounted on a flexible substrate 8, as transmissive optical sensors for detecting the rotation of the rotation operation dial 5. In the shown example, the photointerrupters 8a are disposed in the vicinity of the outer circumference edge (in the vicinity of the outer edge) of the rotation operation dial 5. Thus, as will be described later, the detection accuracy of the photointerrupters 8a is less likely to be affected by the dimensional accuracy related to the width of light shielding blades (detected portions) 5e, the positions of the photointerrupter 8a and the light shielding blades 5e or the like.

On the side of the surface of the flexible substrate 8 on which the photointerrupters 8a are mounted, a plurality of metal dome switches 8b corresponding to the center button 7, the up/down/left/right directions buttons described above, and other pressing buttons is integrally held. The flexible substrate 8 is fixed to a plate (attachment member) 9, serving as the base, with a double-sided tape 10. A configuration in which the flexible substrate 8 is fixed to the plate 9 is referred to as a plate unit 50.

A holder member 60 holds the rotation operation dial 5 so as to be rotatable (able to rotate) and to be capable of swinging in a plurality of directions. The holder member 60 includes a spring holding member (supporting member) 11 that is an inner annular portion and a swing member 12 that is an outer annular portion. The swing member 12 is located more on the outer circumference side than the spring holding member 11.

A spring member (elastic member: urging member) 14 has an arcuately curved shape portion 14b, and has curved portions 14a having a U shape formed on both ends of the spring member 14. The spring member 14 is held by the spring holding member 11 with the inner wall sides of the U-shaped curved portions 14a engaged with outer circumference surfaces of two spring holding portions 11a of the spring holding member 11. Furthermore, the spring holding member 11 is provided with two detachment prevention portions 11b so as to prevent the spring member 14 from detaching and to generate a precharge force for stabilizing the spring member 14 in the initial state.

In the above-described state, the spring holding member 11 is fixed to the plate 9 by positioning a plurality of pin-shaped caulking portions 11c, provided to the spring holding member 11, in holes 9a formed on the plate 9, and then caulking the caulking portions 11c protruding on the back surface side of the plate 9.

Similarly, the swing member 12 is fixed to the plate 9 by positioning a plurality of pin-shaped caulking portions 12a, provided to the swing member 12, in holes 9b formed on the plate 9, and then caulking the caulking portions 12a, protruding on the back surface side of the plate 9.

In the shown example, the spring member 14 does not have a complicated bent shape, and can be easily processed. Furthermore, the part dimension of the spring member 14 can be easily stabilized. Furthermore, the spring member 14 is assembled simply by engaging with the two spring holding portions 11a provided to the spring holding member 11, and thus can be easily assembled without the need for caulking welding, and the like.

Next, a process of assembling the rotation operation dial 5 to the holder member 60 will be described.

The rotation operation dial 5 is rotatably and slidably supported with respect to the spring holding member 11, by a shaft 5a formed on the rotation operation dial 5 being inserted in a fitting hole 11d formed in the spring holding member 11. A fitting length dimension in a rotation axis direction of the rotation operation dial 5 held by the spring holding member 11 is shorter than the rotation axis length. Thus, the rotation operation dial 5 can be rotated with respect to the spring holding member 11 and can slightly tilt so as to be able to swing.

The swing member 12 has a surface, on the side of the rotation operation dial 5, provided with four sliding portions 12b arranged at approximately equal intervals in the circumference direction. The sliding portions 12b slide with respect to a semicircular rib 5b provided to the rotation operation dial 5, when the rotation operation dial 5 rotates. Furthermore, the swing member 12 has a surface, facing the flexible substrate 8, provided with a plurality of push portions 12d for pushing the plurality of metal dome switches 8b described above. The push portions 12d are provided so as to be positioned on the opposite side of the sliding portions 12b. Furthermore, an annular portion 12c is provided to connect the sliding portions 12b and the push portions 12d to each other. The annular portion 12c is formed to be relatively thin with respect to the sliding portions 12b or the push portions 12d, to be elastically deformable.

Next, a process of assembling the display board 6 to the rotation operation dial 5 will be described.

First, the display board 6 is inserted into a stepped opening 5c formed in the rotation operation dial 5. In this process, the display board 6 is fixed to the plate 9, by positioning a plurality of pin-shaped caulking portions 6a, provided to the display board 6, in holes 9c formed in the plate 9, and then caulking the pin shape protruding on the back surface side of the plate 9. Then, a semicircular rib 5d formed on the rotation operation dial 5 and a reception surface 6b formed on the display board 6 can slide against each other. Thus, the rotation operation dial 5 is prevented from detaching.

Furthermore, the display board 6 has an arm-shaped portion 6e, thinner than an outer view upper portion 6f and a fixed portion 6d, is formed between the outer view upper portion 6f and the fixed portion 6d. The display board 6, provided with springiness due to the arm-shaped portion 6e, is coupled to the plate 9. Thus, the display board 6 even in a state of being calked and fixed to the plate 9, can integrally swing upward and downward with the rotation operation dial 5.

Thus, the rotation operation dial 5 is held so as to be capable of rotating and swinging about the hole formed on the spring holding member 11. Furthermore, the rotation operation dial 5 can be pressed and operated at positions, on the rotation operation dial 5, corresponding to the metal dome switches 8b arranged on the upper, lower, left, and right sides.

It should be noted that the rotation operation dial 5 is provided with a semicircular rib 5f to prevent the swing operation of the rotation operation dial 5 from involving troubles such as the spring member 14 being caught. Furthermore, the rib 5f comes into contact with the spring holding member 11 before the spring member 14 comes into contact with the spring holding member 11.

Thus, the spring member 14 is disposed in a space defined between the rotation operation dial 5 and the spring holding member 11, and the space is larger than the thickness of the spring member 14.

Next, a process of assembling the center button 7 to the display board 6 will be described.

After the center button 7 is inserted into a hole 6c provided in the display board 6, a long rectangular shaft 7a formed in the center button 7 is aligned with and slidably fit in a long hole 6g formed in the display board 6. Further, claw portions 7b formed on the center button 7 is retained on the vicinity of the reception surface 6b, formed on the display board 6, by snap fitting. As a result, the center button 7 can be pressed and operated.

Next, detection of rotation of the rotation operation dial 5 will be described.

The light shielding blades 5e made of metal are formed in the rotation operation dial 5 by insert molding, and the light shielding blades 5e rotate and swing integrally with the rotation operation dial 5. Specifically, the light shielding blades 5e are provided concentrically with the rotation operation dial 5 about the rotation axis of the rotation operation dial 5, and the light shielding blades 5e rotate along with the rotation of the rotation operation dial 5.

The light shielding blades 5e are arranged at an equal angle, so that when the rotation operation dial 5 is operated to be rotated, light, transmitted and received between a light emitting unit and a light reception unit of the photointerrupters 8a, is shielded and transmitted repeatedly in accordance with the rotation angle.

The number of light shielding blades 5e corresponds to the number of recesses 5g or protrusions 5h formed continuously along the outer circumference edge on the back surface side of the rotation operation dial 5. In this example, the number of light shielding blades 5e is 12. Thus, the number of light shielding blades 5e is the same as the number of recesses 5g and the number of protrusions 5h.

Thus, an operation to cause one rotation of the rotation operation dial 5 involves 12 clicks and 12 signals.

Furthermore, the two photointerrupters 8a are arranged. In this example, the two photointerrupters 8a are arranged at positions always resulting in half phase shift between two pulse waveforms generated in accordance with shielding and transmission of light due to the light shielding blades 5e. Thus, the direction of the rotation of the rotation operation dial 5 can also be detected.

The photointerrupters 8a and the light shielding blades 5e are arranged with a predetermined clearance in between, so as not to come into contact with each other due to the swing operation of the rotation operation dial 5.

Figure 5A:
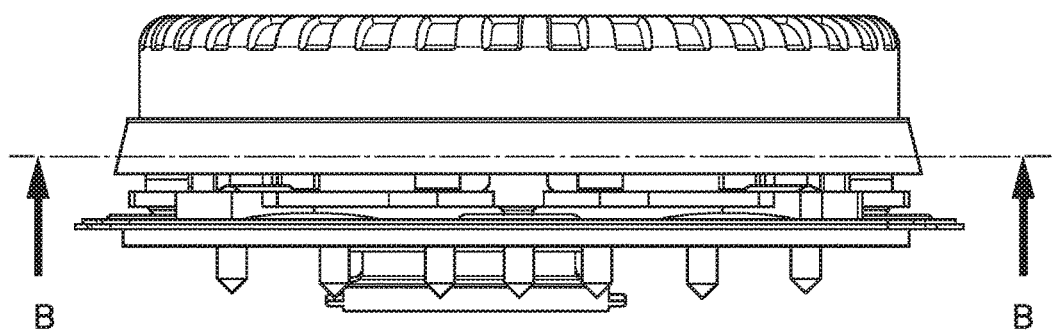
FIGS. 5A to 5C are diagrams for describing a rotation click of the rotation operation dial shown in FIG. 1.
Figure 5B:
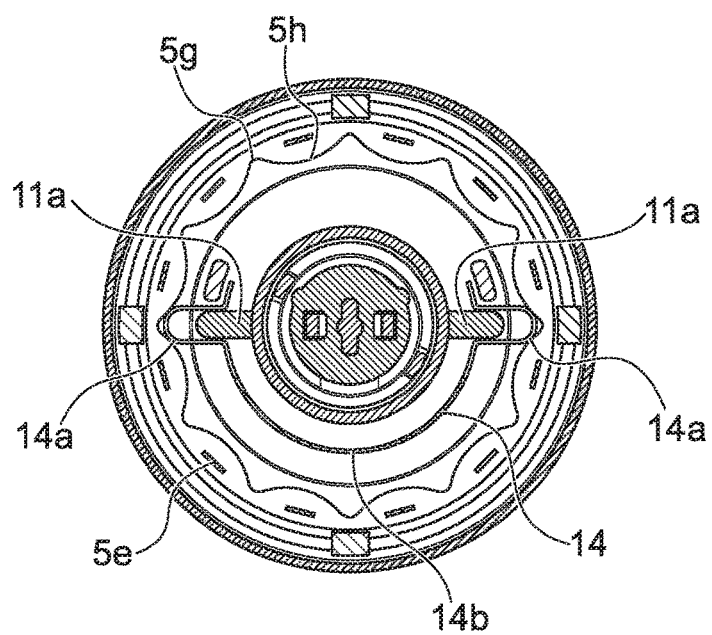
Figure 5C:
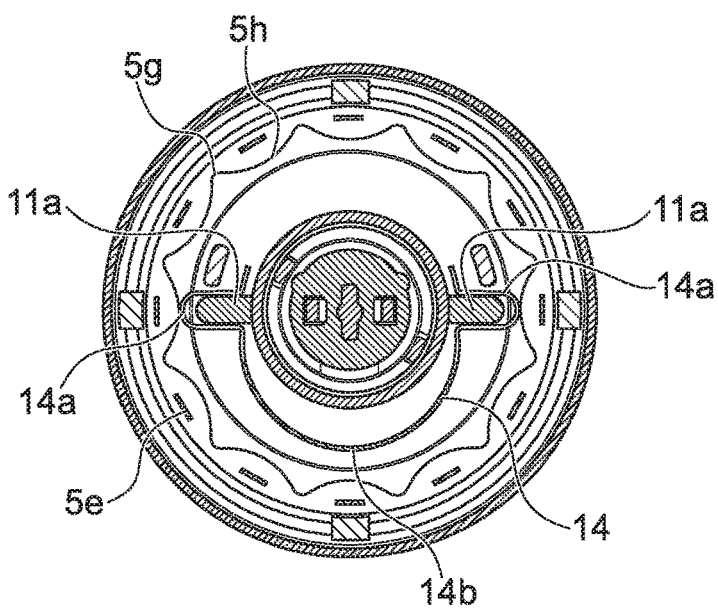

FIGS. 5A to 5C are diagrams for describing a rotation click of the rotation operation dial 5 shown in FIG. 1. FIG. 5A is a side view of the rotation operation dial device 4 shown in FIG. 1 as viewed from the bottom side of the camera 1. FIG. 5B is a cross-sectional view of the rotation operation dial device 4 in a case where the rotation operation dial 5 is in a stopped state, taken along line B-B in FIG. 5A. FIG. 5C is a cross-sectional view of the rotation operation dial device 4 in a case where the rotation operation dial 5 is in an intermediate position state, taken along line B-B in FIG. 5A.

As described above, the rotation operation dial 5 is provided with recesses and protrusions (recess/protrusion part) (12 recesses and 12 protrusions in the example shown) that are continuously formed along the outer circumference on the back surface side. With this configuration, even when the recesses 5g and the protrusions 5h are arranged close to each other in a circumferential direction as a result of increasing the number of clicks, that is, the number of the recesses and protrusions while keeping the outer diameter size of the rotation operation dial 5, the operation feeling can be less likely to be affected, which makes it possible to obtain clear and good operation feeling.

In a state in which the spring member 14 is incorporated in the rotation operation dial 5, the U-shaped curved portions 14a formed at both ends of the spring member 14 exhibit resilience force to be opened toward the outer side from the rotation center axis direction of the rotation operation dial 5. Thus, as shown in FIG. 5B, the U-shaped curved portions 14a stay in (contact to) the recesses 5g, and the rotation operation dial 5 can be stopped at a stable position.

It should be noted that in this state, the light shielding blades 5e are disposed at positions so as not to shield the light to the photointerrupter 8a. Thus, the output from the photointerrupter 8a when the rotation operation dial 5 is stopped is maintained to be constant.

When the rotation operation dial 5 is operated to be rotated, as shown in FIG. 5C, the U-shaped curved portions 14a are moved up onto the protrusions 5h, and then down into the recesses 5g. As a result, the spring member 14 moves in amplitude and functions as a spring so that a clicking feel can be generated.

It should be noted that in this state, sufficient clearance is set so that the arcuately curved shape portion 14b or the end of the U-shaped portion (curved portion 14a) of the spring member 14 does not interfere with and the spring holding member 11 or the rotation operation dial 5.

As a result, a smooth operation can be performed with no fluctuation in the rotation operation force during the rotation of the rotation operation dial 5. Furthermore, the height of the recesses and protrusions in the thickness direction is designed to be substantially the same as the height of the spring member 14 in the thickness direction, so that the wearing of the recesses and protrusions due to the spring member 14 can be suppressed and stable rotation operation force can be achieved.

Here, in order to achieve both downsizing and enhancement of rotation operation force of the rotation operation dial 5, it is necessary to be secured a sufficient amplitude movement region of the spring member 14.

Next, the relationship among the light shielding blades 5e, the recesses and protrusions, and the spring member 14 will be described.

As described above, the light shielding blades 5e are formed in the rotation operation dial 5 by insert molding. To prevent the light shielding blades 5e from collapsing, base parts of the light shielding blades 5e are covered with resin. The recesses and protrusions are formed in the resin portion covering the base parts of the light shielding blades 5e, with the recesses 5g each provided between adjacent light shielding blades 5e and the protrusions 5h provided on straight lines connecting the rotation center axis and the light shielding blades 5e.

Furthermore, the spring members 14 are disposed in a space that is on the side opposite to the light shielding blades 5e across the recesses and protrusions, that is, are provided on the rotation center axis side of the rotation operation dial 5. With this configuration, the spring member 14 and the light shielding blades 5e can be prevented from coming into contact with each other, and the amplitude space of the spring member 14 can efficiently and sufficiently ensured. As a result, enhancement of the rotational operation force can be achieved.

Furthermore, the amplitude space of the spring member 14 can be more ensured, with a diameter of the circle connecting the tops of the recesses 5g to each other set to be larger than the diameter of the circle connecting the light shielding blades 5e to each other.

As described above, with the embodiment of the present invention, clear and good operation feeling and excellent durability, as well as downsizing of the rotation operation dial device can be achieved. Such a rotation operation dial device can be produced at low cost.

It should be noted that in the shown example, the spring holding member 11 and the swing member 12 are provided as separate members, but the spring holding member 11 and the swing member 12 may be integrally formed. Furthermore, the rotation operation dial 5 and the light shielding blade 5e integrally formed by insert molding, can also be formed as separate members and fixed to each other by adhesion or the like, for example. Furthermore, the rotation operation dial 5 itself may be formed to have the shapes of the light shielding blades 5e.

In the above described example shown in the figures, the rotation operation dial device has the center button 7. However, the center button 7 does not necessarily need to be provided, and the same effect can be obtained with a rotation operation dial device that does not include the center button 7. In the above described example shown in the figures, the photointerrupters 8a are used as the rotation detection unit. Alternatively, a reflective photoreflector may be used.

In the above description, a compact digital camera having a built-in retractable lens is described as an electronic device. However, the present invention can be applied to a digital single-lens reflex camera to which a lens unit is detachably attached or to electronic apparatuses other than image pickup apparatuses.

Although preferable embodiments of this invention are described above, the configuration of the present invention is not limited to the examples in the above described embodiments. A material, a shape, a dimension, a form, a quantity, an arrangement location, and the like may be modified as appropriate as long as the concept of the present invention is not deviated.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-002021, filed Jan. 9, 2019, which is hereby incorporated by reference herein in its entirety.

What is claimed is:

1. A rotation operation input device configured to perform setting in accordance with an operation on a rotation operation member, the rotation operation input device comprising:
 detected portions configured to rotate along with rotation of the rotation operation member; and
 an optical sensor configured to detect the detected portions and to detect a phase of the rotation operation member,
 wherein the detected portions are provided at a predetermined interval along an outer edge of the rotation operation member,
 wherein the outer edge of the rotation operation member is provided with a recess/protrusion part for continuously providing a clicking feel,
 wherein recess parts of the recess/protrusion part are each positioned between the detected portions, along a rotation direction of the rotation operation member,
 wherein protrusion parts of the recess/protrusion part are each positioned on each straight line connecting each detected portion and a rotation axis of the rotation operation member, and
 wherein (a) an urging member that urges the recess/protrusion part and (b) the detected portions are provided on opposite sides of the recess/protrusion part.

2. The rotation operation input device according to claim 1, wherein a diameter of a circle connecting tops of the recess parts to each other is larger than a diameter of a circle connecting the detected portions to each other.

3. The rotation operation input device according to claim 1, wherein each of the number of the recess parts and the number of the protrusion parts is same as the number of the detected portions.

4. The rotation operation input device according to claim 1, wherein the urging member is an elastic member having an arc shape, and
 wherein curved portions that come into contact with the recess/protrusion part are formed on both end portions of the elastic member.

5. The rotation operation input device according to claim 4, wherein each of the curved portions is U shaped.

6. The rotation operation input device according to claim 1 further comprising:
 a supporting member configured to rotatably support the rotation operation member;
 an attachment member to which the supporting member is fixed; and
 a flexible substrate which is provided to the attachment member and to which the sensor is provided.

7. The rotation operation input device according to claim 6, wherein the rotation operation member is swingably supported by the supporting member.

8. The rotation operation input device according to claim 6, wherein the urging member is disposed in a space defined between the rotation operation member and the supporting member, and
 wherein the space is larger than a thickness of the urging member.

9. The rotation operation input device according to claim 8, wherein the rotation operation member is provided with a rib that makes the space larger than the thickness of the urging member.

10. An electronic apparatus comprising:
 a rotation operation input device configured to perform setting in accordance with an operation on a rotation operation member;
 one or more memories that store instructions; and
 one or more processors that execute the instructions to perform control in accordance with the setting performed by the rotation operation input device,
 wherein the rotation operation input device comprises:
 (1) detected portions configured to rotate along with rotation of the rotation operation member; and
 (2) a detection unit an optical sensor configured to detect the detected portions and to detect a phase of the rotation operation member,
 wherein the detected portions are provided at a predetermined interval along an outer edge of the rotation operation member,
 wherein the outer edge of the rotation operation member is provided with a recess/protrusion part for continuously providing a clicking feel,
 wherein recess parts of the recess/protrusion part are each positioned between the detected portions, along a rotation direction of the rotation operation member, wherein protrusion parts of the recess/protrusion part are each positioned on each straight line connecting each detected portion and a rotation axis of the rotation operation member, and wherein (a) an urging member that urges the recess/protrusion part and (b) the detected portions are provided on opposite sides of the recess/protrusion part.

11. The rotation operation input device according to claim 1, wherein tops of the protrusion parts of the recess/protrusion part are respectively positioned on straight lines connecting each detected portion and the rotation axis of the rotation operation member.

12. The electronic apparatus according to claim 10, wherein tops of the protrusion parts of the recess/protrusion part are respectively positioned on straight lines connecting each detected portion and the rotation axis of the rotation operation member.

* * * * *